United States Patent Office 2,870,113
Patented Jan. 20, 1959

2,870,113

METHOD FOR PRODUCING FINELY DIVIDED SOLID 1-OLEFIN POLYMER

Rufus V. Jones, Bartlesville, Okla., assignor to Phillips Petroleum Company, a corporation of Delaware No Drawing. Application April 6, 1955
Serial No. 499,768

9 Claims. (Cl. 260—34.2)

This invention relates to the production of finely divided polymers. In a more specific aspect, this invention relates to a method for producing finely divided solid polymers of ethylene and other polymers having similar physical characteristics.

Polymers such as polyethylene are prepared under a variety of temperatures and pressures and in the presence or absence of various catalysts. The solid polymers which are produced are frequently tough, relatively high molecular weight materials which cannot be readily pulverized or finely divided. Methods which can be used for finely dividing or pulverizing crystalline materials are frequently not suitable for finely dividing a polymer such as polyethylene or copolymers of ethylene and other low molecular weight olefins, such as propylene or 1-butene. A finely divided polymer is not obtained by merely precipitating polyethylene from a solution in a given solvent. For example, when polyethylene is dissolved in benzene and the resulting solution is added to a liquid in which the polymer is substantially completely insoluble, such as isopropyl alcohol, the polymer precipitates in the form of relatively large particles which are non-uniform in character and frequently of a stringy nature.

Finely divided solid polymers having uniform particle size are required in various applications. For example, in the preparation of solid compositions in which polyethylene is to be incorporated as a uniform dispersion, it is sometimes necessary to have not only a uniform particle size but a very finely dispersed material. Also, in the preparation of plastisols a finely divided, uniform particle size polymer is required. Furthermore, when a polymer is purified to produce a white solid polymer, better contacting of the polymer particles is achieved and more complete removal of impurities results when a finely dispersed material of uniform particle size is available.

It is an object of this invention, therefore, to provide a method for producing a finely divided solid polymer.

It is a further object to provide a method for producing a finely divided polyethylene polymer.

I have discovered that a finely divided solid polymer is obtained by passing the polymer swollen with a solvent for the polymer into a dispersing agent and comminuting the polymer in the presence of the dispersing agent. It has been found that the comminution of the polymer in the presence of the dispersing agent alone does not provide the same uniform, fine particle size polymer that is obtained by the method of this invention. It is preferred that the moist polymer swollen with the solvent be separated from any free liquid solvent before the swollen polymer is added to the dispersing agent, since it has been found that comminution of the polymer in the presence of both free liquid solvent and liquid dispersing agent does not provide the same fine particle size polymer that is obtained in accordance with the method of this invention.

The method of the invention can be carried out by contacting the polymer to be treated, preferably small pieces or granules of the polymer, with a solvent for the polymer so as to moisten and swell the polymer with the solvent. In some polymerization reactions utilized in the art, polymers are produced initially in the presence of a diluent which is a solvent for the polymer, and in this instance, a desirable method for operating in accordance with this invention is to simply cool the total effluent from the polymerization reactor so as to precipitate solid polymer from the diluent or solvent. The polymer is then separated from the free diluent or solvent and a moist and swollen polymer is obtained which is then added to the dispersing agent and comminuted in the presence of the dispersing agent. For example, polyethylene can be prepared in the presence of benzene as a diluent using a mixture of triethylaluminum and titanium tetrachloride as a catalyst and the polyethylene thereby obtained is swollen with benzene. Upon separating the benzene-swollen polymer from free liquid benzene, a fine dispersion of uniform particle size is obtained in accordance with this invention by adding the swollen polyethylene to a dispersing agent, such as isopropyl alcohol, and comminuting the polymer in the presence of the isopropyl alcohol dispersing agent.

The preferred method for obtaining a finely divided solid polymer in accordance with this invention comprises dissolving the solid polymer in a suitable solvent, at elevated temperatures if necessary, cooling the resulting solution to produce a solid precipitate of the polymer in the solvent, separating the solid precipitate from free liquid solvent, adding the moist, swollen precipitate to a dispersing agent and comminuting the polymer in the presence of a dispersing agent. It has been found that treatment of polymers in accordance with the method of this invention produces a very finely divided and uniformly sized polymer, for example, a divided polymer wherein up to 100 percent of the particles have a large dimension in the range from 1.8 to 18 microns.

The polymers to which the method of this invention is directed are solid polymers of aliphatic olefins, such as ethylene, propylene and other 1-olefins. It is preferred that solid polymers of aliphatic 1-olefins having up to and including 8 carbon atoms per molecule be used in the method and copolymers of such olefins with other aliphatic 1-olefins can also be used. Also, copolymers of ethylene and other 1-olefins with minor amounts of styrene or other aryl olefins can also be used. Excellent results have been obtained in accordance with this invention by treating polymers of ethylene produced by several different methods. Such polymers as DYNH, a polyethylene prepared under relatively high temperatures and pressures, are readily comminuted in accordance with this invention. Also, polyethylene polymers prepared by polymerizing ethylene in the presence of a catalyst comprising as an essential ingredient, chromium oxide, including a substantial amount of hexavalent chromium, usually associated with at least one other oxide, for example, in the presence of a liquid diluent, such as cyclohexane, are effectively comminuted according to this invention. Furthermore, the polyethylene polymers prepared by the methods of U. S. Patent 2,699,457, K. Ziegler et al., Canadian Patent 510,145, M. V. Roedel, and Canadian Patent 509,678, D. C. Pease can be used in the method of this invention. Furthermore, polyethylene polymers produced by the method of the copending applications of J. A. Reid, Serial No. 494,281, filed March 14, 1955, H. Lyons and G. Nowlin, Serial No. 495,054, filed March 17, 1955, now abandoned, and J. T. Edmonds, Serial No. 496,340, filed March 23, 1955, are effectively comminuted in accordance with this invention.

The solvents used in the method of this invention are those normally liquid materials which have the property of swelling the polymer or dissolving in the polymer to an appreciable extent. Suitable solvents which can be used are benzene, alkyl-substituted benzenes, such as toluene, xylene, ethylbenzene, and the like, naphthenes, such as cyclohexane, alkyl-substituted naphthenes, such as methylcyclohexane, hydrogenated naphthalenes, such as tetralin, alkyl-substituted naphthalenes, such as 1-ethylnaphthalene and 1-methylnaphthalene, praffins, such as isooctane, isoheptane, n-hexane and n-decane, carbon tetrachloride, tetrachloroethane, and the like.

The amount of solvent used is that amount which is sufficient to swell the polymer with the solvent but which is insufficient to provide any free solvent. By the absence of free solvent, it is meant that there is substantially no liquid solvent present in addition the amount of solvent dissolved or absorbed in the polymer. The amount of the solvent can vary over a relatively wide range, depending upon the specific polymer and its chemical and physical properties as well as upon the specific solvent which is used. The quantity of solvent normally employed is in the range of 25 to 2000 parts of solvent per 100 parts of polymer on a weight basis. It is preferred that the quantity of solvent used be in the range of 100 to 1000 parts of solvent per 100 parts of polymer on a weight basis. Solvents other than those specifically mentioned above and which are known in the art to be suitable for swelling the polymers described herein can also be used. Also, mixtures of the solvents named and other suitable solvents can be used.

The dispersing agents which are used in the method of the invention are polar materials which are miscible with the solvent used but in which the polymer is substantially completely insoluble. The dispersing agents can be alcohols, such as methanol, ethanol, isopropanol, and the like, ketones, such as acetone, methyl ethyl ketone, diethyl ketone, methyl isopropyl ketone, and the like, ethers, such as diethyl ether, ethyl isopropyl ether, and the like, and cyclic ethers, such as dioxane and the like. Other known dispersing agents which are polar materials and which are miscible with the solvent used and in which the polymer is substantially completely insoluble can also be used. The dispersing agent used should also be a normally liquid organic material, preferably one having a boiling point not above 250° F. at one atmosphere.

The amount of the dispersing agent used is that amount required to provide a slurry of the swollen polymer in the dispersing agent. The quantity of dispersing agent is usually in the range from 25 to 50,000 parts per 100 parts of polymer on a weight basis. It is preferred that the amount of dispersing agent used fall within the range of 100 to 5000 parts per 100 parts of polymer on a weight basis. The method of this invention is carried out under such conditions of temperature and pressure that the solvent and/or dispersing agent is maintained in the liquid state. The polymer is comminuted or pulverized in the presence of the dispersing agent at a temperature below the melting point of the particular polymer being treated. The comminution step is usually carried out at a temperature in the range from 50 to 225° F. and the temperature is preferably from 50 to 100° F. The residence time in the pulverizing or grinding apparatus is usually within the range of 1 to 60 minutes and the grinding time is preferably from 5 to 30 minutes.

A wide variety of grinding or pulverizing apparatuses can be used and the type employed will depend upon the particle size of the original polymer to be treated and upon the desired particle size of the dispersed polymer produced in accordance with this invention. Such commercially available grinding equipment as colloid mills, ball mills, roll mills, paste mills, Waring Blendor, Entoleter, Raymond mill and Mikro Pulverizer can be used as the grinding or pulverizing means used in the method of this invention.

After the polymer has been comminuted to the desired particle size, it is separated from the mixture of solvent and the dispersing agent by filtration or any other suitable means. In some instances, the polymer is then washed with an alcohol or other member of the group of dispersing agents referred to herein, filtered, and finally dried either in air or at an elevated temperature at atmospheric or reduced pressure.

The following examples and data are supplied to illustrate the method of this invention and should not be used to restrict unduly the scope of the invention as set forth in the foregoing description.

EXAMPLE I

Three different polyethylene polymers were comminuted in a series of runs. The properties of the polyethylene polymers employed are set forth below in Table I.

Polymer A was a solid polyethylene polymer known commercially as "DYNH" having Designation No. CT–831 which was produced by polymerizing ethylene under relatively high temperature and pressure.

Polymer B was a polyethylene polymer produced by polymerizing ethylene at 285° F. and 420 p. s. i. g. for a reaction time of 4.2 hours over a chromium oxide deposited on silica-alumina catalyst in the presence of cyclohexane as a solvent.

Polymer C was a solid polyethylene polymer produced in the presence of a metalalkyl catalyst.

*Table I*

| Properties | Polymer | | |
|---|---|---|---|
| | A | B | C |
| Density at room temperature (approximately 78° F.), gr./cc | 0.92 | 0.957 | 0.949 |
| Heat distortion, ° F. | 111 | | 144 |
| Melt index | 1.86 | 1.62 | 3.37 |
| Tensile, p. s. i.: | | | |
| (Injection molded) pulled at 20 in./min | 2,060 | | 3,627 |
| (Compression molded) pulled at 20 in./min | 1,900 | | 3,332 |
| Elongation, Percent: | | | |
| (Injection molded) pulled at 20 in./min | 102 | | 26 |
| (Compression molded) pulled at 20 in./min | 750 | | 8 |
| Inherent viscosity | 0.91 | | 1.211 |
| Molecular weight | [1] 20,000 | [2] 36,500 | |
| Impact (Izod), ft. lb./inch notch | | | 0.47 |
| Brittleness temperature, ° F. | | | −13 |
| Melting point, ° F. | | | 245 |
| Ash, percent | | 0.001 | 0.12 |
| Volatiles, percent | | 0.33 | |

[1] Estimated from inherent viscosity value, obtained with a concentration of 0.2 gram per 100 cubic centimeters of tetralin solvent at 130° C.
[2] Based on melt index value.

EXAMPLE II

The solid polyethylene polymers described in Example I were comminuted by a method in accordance with this invention and by other methods for comparative purposes and the resulting distribution of particle size for the polymers are given below in Table II in microns, using the longest dimension to characterize the particles. In order to disperse agglomerates of small particles, the finely divided polymer was suspended in alcohol and observed under a microscope while still moist. Particles of the polymer were examined in this manner at a magnification of 430 and a representative portion of each slide was observed, the particles measured and counted in order to obtain a representative average number of particles in each of the size ranges.

The general method of procedure for treating each of the three polymers was as follows. The polymer was dissolved in methylcyclohexane at about 212° F. to provide a concentration of approximately 1 weight percent polymer. The resulting solution was allowed to cool to room temperature, which took approximately 4 to 6 hours, and the resulting precipitated polymer was separated from the free solvent by suction filtration. Filtration was discontinued when a compact but still moist cake of the polymer was obtained, thus providing a polymer swollen with the solvent.

The particle size distribution in percent of total particles of the polymer obtained from the foregoing filtration step was examined under the microscope and the distribution for each of the three polymers is given in Table II, run Nos. 1, 6 and 11. A sample of the filtration cake produced above was thoroughly dried and it was found that the moist, swollen polymer contained 11.1 weight percent solids.

A sample of the solvent-swollen filter cake produced by the foregoing filtration step containing the weight of polymer on a dry basis indicated in Table II was added to 300 milliliters of methyl alcohol which was being agitated in a Waring Blendor at room temperature. The comminution was continued for periods of time ranging from 5 to 35 minutes, as indicated in Table II. A representative sample of the slurry resulting from the agitation step was taken for analysis. The average number of particles in each particle size range indicated in Table II was determined for at least two samples for each run.

Table II

POLYMER B

| Run No. | Duration of stirring in Waring Blendor (minutes) | Grams of polymer (dry) per 300 ml. methyl alcohol | Particle size distribution, percent of total particles | | | | |
|---|---|---|---|---|---|---|---|
| | | | 1.8 to 18 mu | 18 to 36 mu | 36 to 90 mu | 90 to 180 mu | 180 to 360 mu |
| 1 | (¹) | (¹) | 3 | 15 | 20 | 50 | 12 |
| 2 | 5 | 20 | 95 | 5 | | | |
| 3 | 25 | 20 | 97 | 3 | | | |
| 4 | 5 | 5 | 95 | 5 | | | |
| 5 | 25 | 5 | 100 | | | | |

POLYMER C

| 6 | (¹) | (¹) | 10 | 50 | 30 | 10 | |
| 7 | 5 | 20 | 95 | 5 | | | |
| 8 | 25 | 20 | 100 | | | | |
| 9 | 5 | 5 | 90 | 10 | | | |
| 10 | 25 | 5 | 100 | | | | |

POLYMER A

| 11 | (¹) | (¹) | 5 | 25 | 50 | 20 | |
| 12 | 5 | 20 | 100 | | | | |
| 13 | 20 | 20 | 100 | | | | |
| 14 | 5 | 5 | 100 | | | | |
| 15 | 20 | 5 | 100 | | | | |
| 16 | 35 | 5 | 100 | | | | |

¹ Original precipitate—no stirring.

The remarkably effective comminution of these polymers when treated in accordance with the invention is clearly shown by the data in Table II. Whereas the original precipitate had the majority of the particles falling in the size range of 18 to 360 microns, the finely divided polymer produced by the method of the invention had at least 95 percent of the particles in the size range of 1.8 to 18 microns.

*Example III*

A sample of Polymer A, DYNH, was dissolved in methylcyclohexane, precipitated and filtered by the method set forth in Example II. A quantity of the solvent-swollen polymer thereby produced which contained 20 grams of polymer on a dry basis was added to 300 milliliters of ethyl alcohol which was being agitated in a Waring Blendor. A sample of the solvent-swollen polymer was thoroughly dried and it was found that the swollen polymer contained 14 weight percent solids. After 24 minutes of comminution in the Waring Blendor, a sample of the resulting slurry was examined under the microscope and the particle size distribution determined according to the method described in Example II. One hundred percent of the particles was found to fall in the 1.8 to 18 micron range.

*Example IV*

A sample of the precipitated Polymer B, prepared by the procedure set forth in Example II was dried in a circulating air oven at about 190° F. for approximately 2 hours. About 20 grams of the dried polymer obtained was added to 300 milliliters of methyl alcohol which was being agitated in a Waring Blendor. The polymer was comminuted in the Waring Blendor for approximately 25 minutes. A representative sample of the slurry produced in the Waring Blendor was examined under the microscope by the procedure described in Example II and it was found that 99 percent of the particles were over 200 microns.

This run demonstrates that a finely divided polymer is not obtained by merely comminuting the polymer in a dispersing agent such as methyl alcohol. It is clearly shown that the polymer must be swollen with a solvent for the polymer before its comminution in the dispersing agent in order to obtain particle sizes comparable to those obtained in accordance with the method of the invention.

*Example V*

A 1 percent solution of Polymer C in methylcyclohexane was prepared. About 200 milliliters of the hot solution was poured slowly into about 200 milliliters of isopropyl alcohol while the alcohol was being agitated in a Waring Blendor. After comminuting the polymer in the solvent and dispersing agent for 25 minutes, a sample of the polymer was observed under the microscope in accordance with the method described in Example II. The particle size distribution was 5 percent in the 1.8 to 18 micron range, 90 percent in the 18 to 36 micron range and 5 percent in the 36 to 90 micron range.

This run demonstrates that a finely divided polymer having particle sizes comparable to those obtained in accordance with the method of the invention is not obtained when the comminution in the dispersing agent is carried out in the presence of free solvent.

*Example VI*

About 200 milliliters of the solution of Polymer C in methylcyclohexane prepared in Example V was allowed to cool and then comminuted in a Waring Blendor for 25 minutes. Particle size distribution of the polymer thereby produced was ascertained according to the method of Example II. Five percent of the particles were in the range from 1.8 to 18 microns, 80 percent were in the range from 18 to 36 microns and 15 percent were in the range from 36 to 90 microns.

This run demonstrates that the finely divided polymer obtained by operating in accordance with this invention is not achieved by comminuting the polymer in the presence of a solvent for the polymer by itself.

*Example VII*

A solid polymer of ethylene was prepared by polymerizing ethylene in the presence of a catalyst comprising triethylaluminum and titanium tetrachloride at a temperature in the range from 212 to 225° F. The solid polymer obtained had a density of 0.963 gram per cubic centimeter at room temperature (approximately 78° F.) and a molecular weight of about 73,800. The polymer was prepared in the presence of benzene as a diluent.

The solid polymer was separated from the benzene diluent thus providing a moist cake of the polymer swollen with benzene. The solvent-swollen polymer was dissolved in methylcyclohexane with added heat, allowed to cool to room temperature and precipitated from the methylcyclohexane. The solid precipitate was separated from the methylcyclohexane and 5 grams on a dry basis of the solvent-swollen polymer was added to 200 milliliters of isopropyl alcohol and then comminuted in a Waring Blendor for 5 minutes. Another run was made under the same conditions but in which the comminution was carried out for 25 minutes. Particle size distribution of the polymer thereby produced was ascertained according to the method of Example II. One hundred percent of the particles was in the particle size range from 1.8 to 18 microns.

As will be evident to those skilled in the art, many variations and modifications can be practiced within the scope of the disclosure and claims to the invention. The invention resides in a method for producing a finely divided solid polymer which comprises passing a polymer swollen with a solvent into a dispersing agent and comminuting the polymer in the presence of the dispersing agent.

I claim:

1. A method for producing a finely divided solid polymer of an aliphatic 1-olefin having up to and including 8 carbon atoms per molecule which comprises, dissolving said polymer in a normally liquid solvent selected from the group consisting of benzene, alkyl-substituted benzenes, naphthenes, hydrogenated naphthalenes, paraffins, carbon tetrachloride and tetrachloroethane, cooling the resulting solution to produce a solid precipitate of said polymer in said solvent, separating said precipitate from said solvent to produce a polymer swollen with said solvent, passing said solvent-swollen polymer into a dispersing medium selected from the group consisting of alcohols, ketones, and ethers, said dispersing medium being a normally liquid organic material which is miscible with said solvent but in which said polymer is substantially insoluble, and comminuting said polymer in the presence of said dispersing medium.

2. A method in accordance with claim 1 wherein said polymer is polyethylene, said solvent is methylcyclohexane and said dispersing medium is isopropanol.

3. A method in accordance with claim 1 wherein said polymer is polyethylene, said solvent is methylcyclohexane and said dispersing medium is methanol.

4. A method in accordance with claim 1 wherein said polymer is polyethylene, said solvent is methylcyclohexane and said dispersing medium is ethanol.

5. A method in accordance with claim 1 wherein said polymer is polyethylene, said solvent is benzene and said dispersing medium is methanol.

6. A method in accordance with claim 1 wherein said polymer is polyethylene, said solvent is cyclohexane and said dispersing medium is isopropanol.

7. The method according to claim 1 wherein at least 95 percent of said comminuted polymer has a particle size not greater than 18 microns.

8. A method for producing a finely divided solid polymer of ethylene which comprises, dissolving said polymer in from 100 to 1000 parts of methylcyclohexane per 100 parts of polymer on a weight basis, cooling the resulting solution to produce a solid precipitate of said polymer in said methylcyclohexane, separating said precipitate of polymer from the methylcyclohexane to thereby produce a polymer of ethylene swollen with methylcyclohexane, passing said swollen polymer into from 100 to 5000 parts of isopropanol per 100 parts of polymer on a weight basis, and comminuting said swollen polymer in the presence of said isopropanol.

9. In a process for producing a solid olefin polymer which comprises polymerizing an aliphatic 1-olefin having up to and including 8 carbon atoms per molecule, in the presence of a solvent for said polymer selected from the group consisting of benzene, alkyl-substituted benzenes, naphthenes, hydrogenated naphthalenes, paraffins, carbon tetrachloride and tetrachloroethane, and recovering the polymer so produced in solution in said solvent, the improvement which comprises cooling said polymer solution so as to precipitate solid polymer from said solution; separating said precipitated polymer so as to produce a polymer swollen with said solvent; passing said solvent-swollen polymer into a dispersing medium selected from the group consisting of alcohols, ketones and ethers, said dispersing medium being a normally liquid organic material which is miscible with said solvent but in which said polymer is substantially insoluble; and comminuting said polymer in the presence of said dispersing medium.

References Cited in the file of this patent

UNITED STATES PATENTS

| | | |
|---|---|---|
| 2,313,144 | Gomm | Mar. 9, 1943 |
| 2,561,951 | Roberts | July 24, 1951 |